May 20, 1924.

A. J. SURMAN

YEARLY CAR RECORD SHEET

Filed July 7, 1921

Inventor
Arthur J. Surman

By Mawhinney & Mawhinney
Attorney

Patented May 20, 1924.

1,495,048

UNITED STATES PATENT OFFICE.

ARTHUR JOHN SURMAN, OF PHILADELPHIA, PENNSYLVANIA.

YEARLY CAR-RECORD SHEET.

Application filed July 7, 1921. Serial No. 482,989.

*To all whom it may concern:*

Be it known that ARTHUR JOHN SURMAN, who has taken out his first papers of citizenship in the United States, residing at Philadelphia, in the county of Philadelphia and State of Pennsylvania, has invented certain new and useful Improvements in Yearly Car-Record Sheets, of which the following is a specification.

The present invention relates to improvements in yearly car record sheets and more specifically stated the invention contemplates the provision of a ledger sheet having in comprehensive yet simple and compact form a practical and condensed entry blank for showing the entire year's record of any particular railway car.

At the present time numerous books are actually carried in the accounting department of railroads in order to correctly record the movements of their cars and to make up their accounts with other roads.

An object of my invention is to reduce the number of books now considered necessary and to provide a ledger which will show on a single sheet the entire record of any particular car for the space of one year, and in such a way that the record may be plainly and accurately read and easily and quickly entered, as a result of which great saving in clerical hire and in actual time consumed in making the entries is effected.

With the foregoing and other objects in view, the invention will be more fully described hereinafter and will be more particularly pointed out in the claim appended hereto.

In the drawings, wherein like symbols refer to like or corresponding parts throughout the several views, Fig. 1 is a plan view, with a portion broken away, of a ledger book opened out and showing sheets ruled off and designated according to the present invention;

Fig. 2 is a plan view with portions broken away of a slightly modified form of sheet; and Fig. 3 is a similar view of a slight modification.

Referring more particularly to the drawing, 4 designates generally a ledger book in which sheets 5 are bound. These sheets are ruled off in accordance with a definite plan by vertical lines 6 and by horizontal lines 7 which intersect the vertical lines and divide the page into a number of blocked off spaces for receiving various data. An appropriate heading space 8 is left at the top of each sheet and the designation of the particular car may be placed here with car number. For this purpose the legend "Kind of car" and "No." is placed in the heading space so that a clerk may write in for instance the word "Gondola, No. 1,146,987" to show the car and number of the car. Beneath this heading space 8 is a transfer space 9 suitably designated and if desired divided into blocks preferably at its left hand portion only, the right hand portion being left uninterrupted by any vertical lines for the purpose of receiving data which is the last available record of the car. A column 10 is made at the left hand margin of the sheet and at the head of this column is the word "Transfer" lying at the left hand side and in alignment with the transfer spaces 9.

In a block 11, beneath the word transfer, is placed the year mark for instance "1921" and successively beneath the year mark are the month designations "Jan" "Feb", etc. Extending toward the right of each of the month designations are horizontally extending rows of blocked off spaces 12 and 13, such spaces containing numbers indicating the days of the particular month. These spaces alternate with other horizontal spaces 14 and 15 beneath which suitable loaded or empty marks may be made. Furthermore, beneath the spaces 12 and 14 and above the spaces 13 and 15 are other blocked off spaces 16 and 16' for entering car movements, deliveries and receipts. In a similar manner blocked off spaces 17 are provided beneath the spaces 13 and 15.

The spaces 14 and 15 are preferably of small dimensions as compared with the spaces 12 and 13 in order that the eye may be able to quickly differentiate between the various spaces so that the data may be put in the proper places with respect to the date marks. A suitable number of vertical lines 18 are made at the right hand portion of the leaf of the sheet and they divide this portion of the sheet into a number of vertical columns which are properly captioned. For instance the first column toward the left is designated for the receipt of the initials of the road to which the car has been assigned, or into whose hands it has passed. The second column is headed "Reg" which indicates to the clerk having charge of the books that in this column are to be entered all regular per diem allowances. A third column is provided with the caption "Add" which indicates that this column is intended to receive entries of all additional allowances. A fourth column is headed "Ded" to indicate deductions against allowances, or days deducted on account of over allowances. The last column toward the right is entitled "Disc'y" and herein are to be put down per diem discrepancy checking. The words "Per diem" are preferably placed upon the heading space of the leaf above the columns.

The whole leaf is so arranged and disposed that a suitable amount of paper is left toward the right for the purpose of binding in the book. The opposite leaf 5, which is also shown in Fig. 1, contains a similar scheme and is constructed in a similar manner except that the left hand leaf is intended for the first six months or from January 1, to June 30. The opposite leaf is intended to receive data for the last half of the year, or from July 1, to December 31.

Referring more particularly to Fig. 2, the arrangement here is precisely similar to that shown in Fig. 1 except that the leaf is made longer in a vertical direction and on the left hand side thereof contains the entire record of a single car for a whole year. Obviously if desired a leaf of the size shown in Fig. 1 may possibly be used by reducing the size of the type and space. The arrangement is otherwise entirely the same.

In Fig. 3, I have disclosed a further slight modification of the idea in which the dates of the month extend entirely across a double page of the book and are in a single line, in this case the left leaf contains no vertical columns, but a single row of vertical columns at the right hand portion of the right leaf is sufficient.

In use, the kind of car is first written at the top of heading space 8 as is also its number, and prior records are resorted to to ascertain the last correct record which is brought forward from a prior corresponding sheet and put upon the transfer space 9. When a car is transferred to another road, the initials of that road are placed in the first vertical column to the left opposite the month of delivery of the car. The regular per diem allowances for the car are placed in the second column, while any additional allowances are put down in the third column and any deductions against allowances in the fourth column. Any discrepancy in checking is entered in the last column. The spaces 14 below and to the right of each date of the month may be provided with check marks or initials to indicate that the car was loaded or empty at the time of its delivery to the other road.

The spaces 16 and 17 directly beneath the dates may be provided with suitable marks to indicate car records, receipts and deliveries, while the spaces directly beneath the spaces 14 and 15 are provided to receive loaded or empty marks.

It will thus be seen that a record is kept month by month and for the entire twelve months on a single sheet or double sheet of a ledger book and that reference does not have to be made to other books or sheets in order to complete the record of any particular car. This entails a great saving over the present method as a great deal of time is lost in making references to monthly record books for prior records, account of per diem discrepancy claims, car tracing, routing, statements or in the many phases of equipment service routine work based upon the correct recording of railroad equipment.

Inasmuch as the improved sheet forms a continuous yearly record there is but one transfer brought forward as distinguished from a transfer from month to month as is done at the present time. This means a large saving in clerk hire and also precludes incorrect or stray records from being brought forward, the reporting of which is a source of unnecessary correspondence and time lost in corrections.

The use of this form will reduce the number of books now in general use to about one-half, and to nearly one-half of their size, for example:—an equipment of 30,000 cars divided into ten books for twelve months, will comprise 120 books of 3,000 cars each; whereas, the same equipment divided into 500 cars each recorded on my yearly car record form, will require only 60 books for the year of less than one-half the size of car record books now in general use. Of course, the racking space necessary to hold the books is reduced to nearly one quarter. The invention is attended with a large saving of paper, printing, binders, file cases, space, time, handling, etc., and has many advantages from a clerical standpoint and it will reduce the possibility of erroneous recording of data of this character to a minimum.

The marks in Fig. 1 indicate that on March 1 a car moved from Wilmington loaded to Gray's Ferry; that it left Gray's Ferry loaded ($x$) on March 3 and that the same car arrived at West Philadelphia on March 4 where it was unloaded as indicated by the empty mark (—).

The binding for the leaves is preferably a loose-leaf binding on account of new cars being inserted to take the place of cars out of service.

It is obvious that various changes and modifications may be made in the details of construction and design of the above specifically described embodiment of this invention without departing from the spirit thereof, such changes and modifications being restricted only by the scope of the following claim.

What is claimed is:—

A single ledger page for receiving the entire year's record of a car, having vertical and horizontal lines thereon ruling the page into a series of vertically extending columns and horizontally lying blocks, the blocks at the left hand margin of the page being enlarged and containing the names of the months, the horizontally extending blocks from each of the month spaces being smaller and extending in superposed rows, said rows of spaces being alternately of different sizes, the smaller alternating spaces containing numbers indicating the days of the month and having vacant spaces between and beneath same for receiving loaded and emptied marks and location marks, an appropriately designated horizontally extending heading space at the top of the page ruled off from the columns and adapted to contain data identifying the particular car, a sub-heading horizontal space lying above the columns and separated from the main heading space for receiving data referring to the transfer of the car, said page being ruled at the right hand margin thereof into a number of relatively wide vertical columns having captions at the top thereof in the sub-heading space and adapted to receive data concerning the foreign road, regular per diem allowances, additional and deducted allowances and discrepancy checking.

In testimony whereof I affix my signature.

ARTHUR JOHN SURMAN.